United States Patent
Lafuente Alvarez et al.

(10) Patent No.: US 8,625,433 B2
(45) Date of Patent: Jan. 7, 2014

(54) METHOD AND APPARATUS FOR USE IN A COMMUNICATIONS NETWORK

(75) Inventors: Luis Maria Lafuente Alvarez, Madrid (ES); Alfonso Celaya Prieto, Madrid (ES); Javier Perez Fernandez, Rivas Vaciamadrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 704 days.

(21) Appl. No.: 12/809,456

(22) PCT Filed: Dec. 19, 2007

(86) PCT No.: PCT/EP2007/064189
§ 371 (c)(1),
(2), (4) Date: Jun. 18, 2010

(87) PCT Pub. No.: WO2009/080095
PCT Pub. Date: Jul. 2, 2009

(65) Prior Publication Data
US 2011/0026460 A1 Feb. 3, 2011

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl.
USPC ........................................................ 370/237

(58) Field of Classification Search
None
See application file for complete search history.

(56) References Cited

U.S. PATENT DOCUMENTS

2006/0067338 A1* 3/2006 Hua et al. ........................ 370/400
2009/0080440 A1* 3/2009 Balyan et al. ................. 370/400
2010/0299451 A1* 11/2010 Yigang et al. ................. 709/241

FOREIGN PATENT DOCUMENTS

WO WO 2005/107213 A1 11/2005

OTHER PUBLICATIONS

Author Unknown, User Identity to HSS Resolution, Ericsson submission to 3GPP TSG CN Work Group 4, Feb. 1, 2002, pp. 1-4.*
P. Calhoun, J. Loughney,E. Guttman, G. Zorn and J. Arkko, RFC 3588: Diameter Base Protocol, Sep. 2003, pp. 1-131.*
Ericsson: "User identity to HSS resolution" 3GPP Draft; N4-020160, 3rd Generation Partnership Project (3GPP), Mobile Competence Centre , 650, Route Des Lucioles, F-06921 Sophia-Antipolis Cedex, France, no. Sophia; 20020128, Jan. 24, 2002, XP050080118.
Calhoun Airespace P et al: "Diameter Base 1-23 Protocol; rfc3588. txt" IETF Standard, Internet Engineering Task Force, IETF, CH,1 Sep. 2003, XP015009370.

* cited by examiner

Primary Examiner — John Blanton
Assistant Examiner — Christopher Crutchfield (57) ABSTRACT

A method of enabling redundancy for a Home Subscriber Service (HSS) of an IP Multimedia Subsystem (IMS) is provided. Redundancy is provided by a plurality of HSS instances. Where a client node of the IMS requires details of an HSS, the client node is provided with details of a proxy HSS representing the HSS instances. The client node uses the details to send a subsequent request directed to the proxy HSS. The proxy HSS selects an appropriate one of the HSS instances to handle the request received at the proxy HSS from the client node. The proxy HSS forwards the request to the selected HSS instance for handling.

18 Claims, 5 Drawing Sheets

METHOD AND APPARATUS FOR USE IN A COMMUNICATIONS NETWORK

TECHNICAL FIELD

The present invention relates to a method and apparatus for use in a communications network, for example a Universal Mobile Telecommunications System having an IP Multimedia Subsystem.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the 3rd Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Specific details of the operation of the UMTS communications network and of the various components within such a network can be found from the Technical Specifications for UMTS that are available from http://www.3gpp.org. Further details of the use of SIP within UMTS can be found from the 3GPP Technical Specification TS 24.228 V5.8.0 (2004-03).

Figure 1:
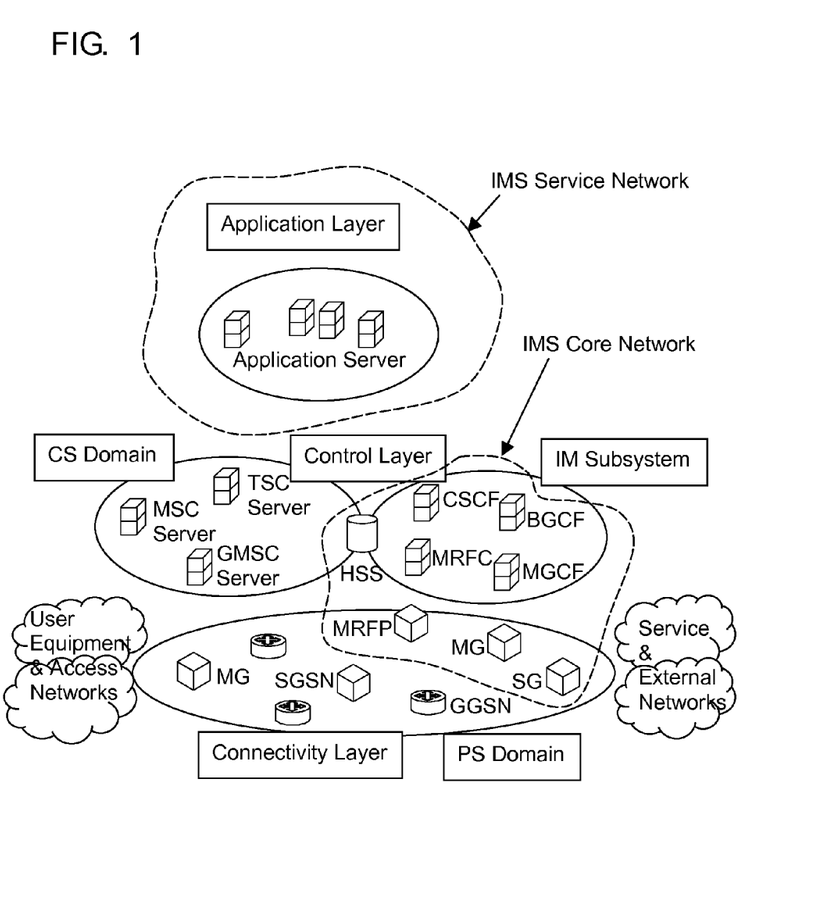
FIG. 1, discussed hereinbefore, illustrates schematically the integration of an IP Multimedia Subsystem into a 3G mobile communications system.

FIG. 1 of the accompanying drawings illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criterion for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select a S-CSCF if a S-CSCF is not already selected. The I-CSCF receives the required S-CSCF capabilities from the home network's Home Subscriber Server (HSS), and selects an appropriate S-CSCF based on the received capabilities. (It is noted that S-CSCF allocation is also carried out for a user by the I-CSCF in the case where the user is called by another party, and the user is not currently allocated an S-CSCF.) When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) application server will determine the new terminating party to which a call to a given subscriber will be forwarded. In the case that an IFC indicates that a SIP message received at the S-CSCF should be forwarded to a particular SIP AS, that AS is added into the message path. Once the SIP message is returned by the AS to the S-CSCF, it is forwarded on towards its final destination, or forwarded to another AS if this is indicated in the IFCs.

As mentioned above, in an IMS network, the HSS is mainly in charge of storing the subscriber data. The HSS inter-works with other nodes (referred to herein generally as "HSS clients") by means of the Diameter protocol (RFC 3588). Examples of such HSS client are the I-CSCF, S-CSCF, AP (Aggregation Proxy) and AS (Application Server).

The general intention is that the HSS is a central database for a domain. However, some networks have more users than can be handled by a single HSS, and these networks are therefore provided with more than one HSS. Networks with more than one HSS also contain a Subscription Location Function (SLF). Nodes that need to query an HSS about a particular user first query the SLF, which returns the address of the HSS handling the user. The SLF essentially acts as a Diameter redirect agent.

However, the standalone scenario, with only one HSS and no SLF deployed in the network, is very common in current deployments and must also be considered.

Diameter routing logic involving the HSS can be found in 3GPP TS 29.228. Although the following extracts are focused on CSCF nodes, they apply equally to any other type of HSS client.

"If an I-CSCF or S-CSCF knows the address/name of the HSS for a certain user, both the Destination-Realm and Destination-Host AVPs (Attribute Value Pairs) shall be present in the request. Otherwise, only the Destination-Realm AVP shall be present and the command shall be routed to the next Diameter node, e.g. the SLF, based on the Diameter routing table in the client.

Once the redirector function (SLF) has returned the address or the destination HSS (using Redirect-Host AVP), the redirected request to the HSS shall include both Destination-Realm and Destination-Host AVPs.

The S-CSCF stores the address of the HSS for each user, after a first request sent to the redirector function.

Requests initiated by the HSS towards an S-CSCF shall include both Destination-Host and Destination-Realm AVPs. The HSS obtains the Destination-Host AVP to use in requests towards an S-CSCF, from the Origin-Host AVP received in previous requests from the S-CSCF. Consequently, the Destination-Host AVP is declared as mandatory in the ABNF for all requests initiated by the HSS.

Destination-Realm AVP is declared as mandatory in the ABNF for all requests."

As appreciated by the applicant, one issue that is not specifically addressed in the 3GPP standard is that of a redundancy solution for the HSS: in a real deployment the user data might be stored in more than one HSS (for instance in a hot/standby configuration, which is the one currently available in TSP, load sharing, and so on). A mechanism that would allow an HSS client to learn the right HSS address is not specified in the 3GPP standard. The IETF Diameter document (RFC3588) provides a redundancy solution for "Diameter agents" but not for destination hosts. For example, in 3GPP IMS a Subscription Location Function (SLF) is a "Diameter redirect agent", and a Home Subscriber Server HSS is a destination host.

It is desirable to address this issue.

SUMMARY

According to a first aspect of the present invention there is provided a method of enabling redundancy for a Home Subscriber Service, HSS, of an IP Multimedia Subsystem, IMS, with redundancy being provided by a plurality of HSS instances, and the method comprising: where a client node of the IMS requires details of an HSS, arranging for the client node to be provided with details of a proxy HSS representing the HSS instances; arranging for the proxy HSS to select an appropriate one of the HSS instances to handle a request received at the proxy HSS from the client node; and arranging for the proxy HSS to forward the request to the selected HSS instance for handling.

The method may comprise, where a Subscription Location Function, SLF, is provided in the IMS, arranging for the SLF to provide the client node with details of the proxy HSS.

The method may comprise, where a Subscription Location Function, SLF, is not provided in the IMS, arranging for the proxy HSS itself to provide the client node with details of the proxy HSS.

The Diameter protocol may be used for communication between the client node and the proxy HSS.

The method may comprise changing a destination host Attribute Value Pair in the received request based on the selection.

Redundancy of the proxy HSS may also be provided, by having a plurality of proxy HSS instances, with redundancy towards the proxy HSS instances being handled by standard Diameter protocol mechanisms.

At least some of the HSS instances may be different respective front ends to a database.

The method may comprise maintaining information at the proxy HSS for use in performing the selection.

The information may comprise at least one of: information relating to respective loads being experienced by the HSS instances; respective availabilities of the HSS instances; and respective statuses of the HSS instances.

Where the database is distributed across a plurality of sites, the information may comprise geographic information relating to the sites.

The method may comprise monitoring the state of each HSS instance for use in performing the selection.

The method may comprise monitoring the state by using Diameter messages.

The method may comprise monitoring the state by using DWR/DWA messages.

The method may comprise performing the selection based on at least one of geographical location, availability, load, and response time.

The proxy HSS may be a node of the IMS.

The proxy HSS may be a Diameter proxy agent.

The client node may be a Diameter client.

The client node may comprise at least one of: an Interrogating Call Session Control Function of the IMS; a Serving Call Session Control Function of the IMS; an Aggregation Proxy of the IMS; and an Application Server of the IMS.

The method may be performed at the proxy HSS.

The HSS may be replaced by a destination host of the IMS other than a HSS.

According to a second aspect of the present invention there is provided an apparatus for enabling redundancy for a Home Subscriber Service, HSS, of an IP Multimedia Subsystem, IMS, with redundancy being provided by a plurality of HSS instances, and the apparatus comprising: means for arranging, where a client node of the IMS requires details of an HSS, for the client node to be provided with details of a proxy HSS representing the HSS instances; means for arranging for the proxy HSS to select an appropriate one of the HSS instances to handle a request received at the proxy HSS from the client node; and means for arranging for the proxy HSS to forward the request to the selected HSS instance for handling.

The apparatus may comprise the proxy HSS.

According to another aspect of the present invention there is provided a method of enabling redundancy for a destination host of an IP Multimedia Subsystem, IMS, with redundancy being provided by a plurality of destination host instances, and the method comprising: where a client node of the IMS requires details of a destination host, arranging for the client node to be provided with details of a proxy destination host representing the destination host instances; arranging for the proxy destination host to select an appropriate one of the destination host instances to handle a request received at the proxy destination host from the client node; and arranging for the proxy destination host to forward the request to the selected destination host instance for handling. The proxy destination host may be a Diameter proxy agent. Apparatus comprising means for performing these method steps is also provided.

According to another aspect of the present invention there is provided a method of enabling redundancy for a protocol server of a communications network, with redundancy being provided by a plurality of protocol server instances, and the method comprising: where a protocol client requires details of a protocol server, arranging for the protocol client to be provided with details of a proxy protocol server representing the protocol server instances; arranging for the proxy protocol server to select an appropriate one of the protocol server instances to handle a request received at the proxy protocol server from the protocol client; and arranging for the proxy protocol server to forward the request to the selected protocol server instance for handling. The protocol may be the Diameter protocol. The proxy protocol server may be a Diameter proxy agent. Apparatus comprising means for performing these method steps is also provided.

According to a third aspect of the present invention there is provided a program for controlling an apparatus to perform a method according to the first aspect of the present invention or which, when loaded into an apparatus, causes the apparatus to become an apparatus according to the second aspect of the present invention. The program may be carried on a carrier medium. The carrier medium may be a storage medium. The carrier medium may be a transmission medium.

According to a fourth aspect of the present invention there is provided an apparatus programmed by a program according to the third aspect of the present invention.

According to a fifth aspect of the present invention there is provided a storage medium containing a program according to the third aspect of the present invention.

An embodiment of the present invention has at least one of the following advantages:

As there is one logical HSS deployed in the network, it is possible for any third party vendor product to take advantage of the HSS redundancy solution (which is not standardized). The interface between the HSS client and the Diameter proxy application is based on pure Diameter standard mechanisms.

No changes in the IP routing tables are needed, and, advantageously, client nodes only need to be configured with the destination address of the Proxy apparatus in an embodiment of the present invention, which is arranged for replacing the destination address received from a client node, which addresses the Proxy apparatus, into a destination address of the server selected therein.

The distribution logic to the destination peer can be configured depending on the scenario: it can be based on load sharing, user location . . . .

A method and apparatus embodying the present invention are valid for both, current "monolithic" HSS and the tiered (layered) HSS architectures. It does not matter whether the final destination is a monolithic HSS or a Front End.

DETAILED DESCRIPTION

It has been mentioned above that the problem of a redundancy solution for the HSS is not specifically addressed in the 3GPP standard. Before a detailed description of an embodiment of the present invention, the following three possible solutions that would address this redundancy problem will now be described in turn, each having some limitations as set out below: (a) route all the traffic through the SLF; (b) rely on Diameter protocol standard procedures; and (c) IP layer based solutions. This will be followed by a description of: (d) other mechanisms for obtaining the redundant node; and then (e) a solution according to an embodiment of the present invention.

(a) Route all the Traffic Through SLF

The SLF could monitor the HSS's state (this is currently done in Ericsson's IPWorks product, for the AS DNS functionality, where SNMP and ICMP are used for this purpose) and only the "active"/"preferred" one would be included in the responses. All the traffic towards the HSS should be routed through the SLF.

However, according to the standard it is not mandatory for an HSS client to poll the SLF whenever a message has to be sent to HSS. Some examples that can be found in current implementations are:

The S-CSCF stores the HSS "destination host" when it is received from SLF the first time it is contacted. From that moment on, and for the same user, that address could be kept. No extra polls are needed.

The HSS destination host can also be sent from the I-CSCF to the S-CSCF by means of a proprietary mechanism (embedded in the SIP REGISTER message). In this way the S-CSCF does not need to retrieve any information from the SLF, since the I-CSCF has received it from the SLF and passed on to the S-CSCF. This implementation is used in Ericsson's CSCF.

Moreover, current deployments do not include an SLF when the number of subscribers is relatively small; this means that the "single HSS scenario" must also be considered.

(b) Rely on Diameter Protocol Standard Procedures

It is not possible to rely on pure standard Diameter mechanisms (see chapter 5.5.4 of RFC 3588) since routing and failover mechanisms are applicable only for scenarios with Diameter Agents in charge of routing the corresponding Diameter application-based messages. In this sense, the failover mechanism provides an alternate way of reaching a given Destination-Host, by using an alternate Diameter agent. If the destination host as such is down, there is no mechanism specified in the RFC. That would be another case.

A Diameter Agent is a Diameter node that provides relay, proxy, redirect or translation services (performs protocol translation between Diameter and another AAA protocol). In other words, they are used for routing Diameter messages to the final destination (specified by the destination host).

(c) IP Layer Based Solutions

Another approach would be to rely on the IP layer: if the redundant nodes shared the same IP address (this would work for hot/standby redundancy solutions; only the "active" node would own the shared IP address) it would be possible to execute the failover with no impact in the applications. This alternative is currently offered by TSP, and it can also be found in other commercial platforms (such as for instance Motorola's AdvancedTCA Communication Server; Sun clusters also include this feature in many products), but it has several drawbacks:

Having an IP that moves from one site to another implies that the host IP part of the routing tables will require some updates in case of node failure (OSPF could be used for this purpose). If the backbone is composed of many routers the traffic routing to the proper destination will not be secured until the complete backbone convergence is achieved. Some backbone tuning might be required in each installation.

As the backbone is usually shared among different solutions changes in it might affect other solutions. Thus some operators may not agree on having such tuning done. Besides the deployment cost will increase exponentially. This is perceived as non secure.

(d) Other Mechanisms for Obtaining the Redundant Node

The redundant node could be statically configured in a table. For every possible HSS Destination-Host in the network it is stated its corresponding secondary (redundant) one. The HSS client could then monitor the HSS's state, and when the primary HSS fails, then it would send the Diameter queries to the configured secondary HSS. A drawback of this alternative is that HSS redundancy will only work in a scenario where all HSS clients in the network (CSCF, Application Servers, AAA server, BSF, etc.) implement this mechanism.

Alternatively, a new AVP conveying information about the redundant nodes could be added in the SLF responses. This is now under investigation in IETF DIME working group. A drawback of this solution is that these AVP are optional (in order to provide backwards compatibility) and therefore it is not possible to ensure that the client will make use of it. Moreover, SLF is needed in order to provide this information and it is not possible to route the message based on other considerations (user location, load balancing, and so on).

(e) An Embodiment of the Present Invention

In an embodiment of the present invention an enhanced Diameter proxy is introduced in order to provide a single logical HSS in the network. Further details will be provided below, but in brief:

Each HSS client can be configured with a single HSS Destination host, and no SLF would then needed (although an embodiment of the present invention can also be used where an SLF is in operation).

The access point to the single logical HSS could comprise one or several enhanced Diameter proxies, with each Diameter message sent from the HSS client being received in one of these proxies. From the HSS client side, the Diameter proxies can be configured like in the standard Diameter interface.

To provide redundancy and to scale the traffic processing capacity, there could be several proxies. Redundancy towards the proxies can be achieved with Diameter standard procedures (see RFC 3588, chapter 5.5.4).

The enhanced Diameter proxy would provide mechanisms to find out what is the most appropriate Diameter peer to process the Diameter message. These peers can be HSS Front Ends (FEs) accessing a database that contains the user data, or monolithic HSSs keeping both the HSS application logic and the user data. These mechanisms consider the HSS monolithic of FE availability, the geographical location of the user data as well as manage the load distribution towards the Diameter peers.

Figure 2:
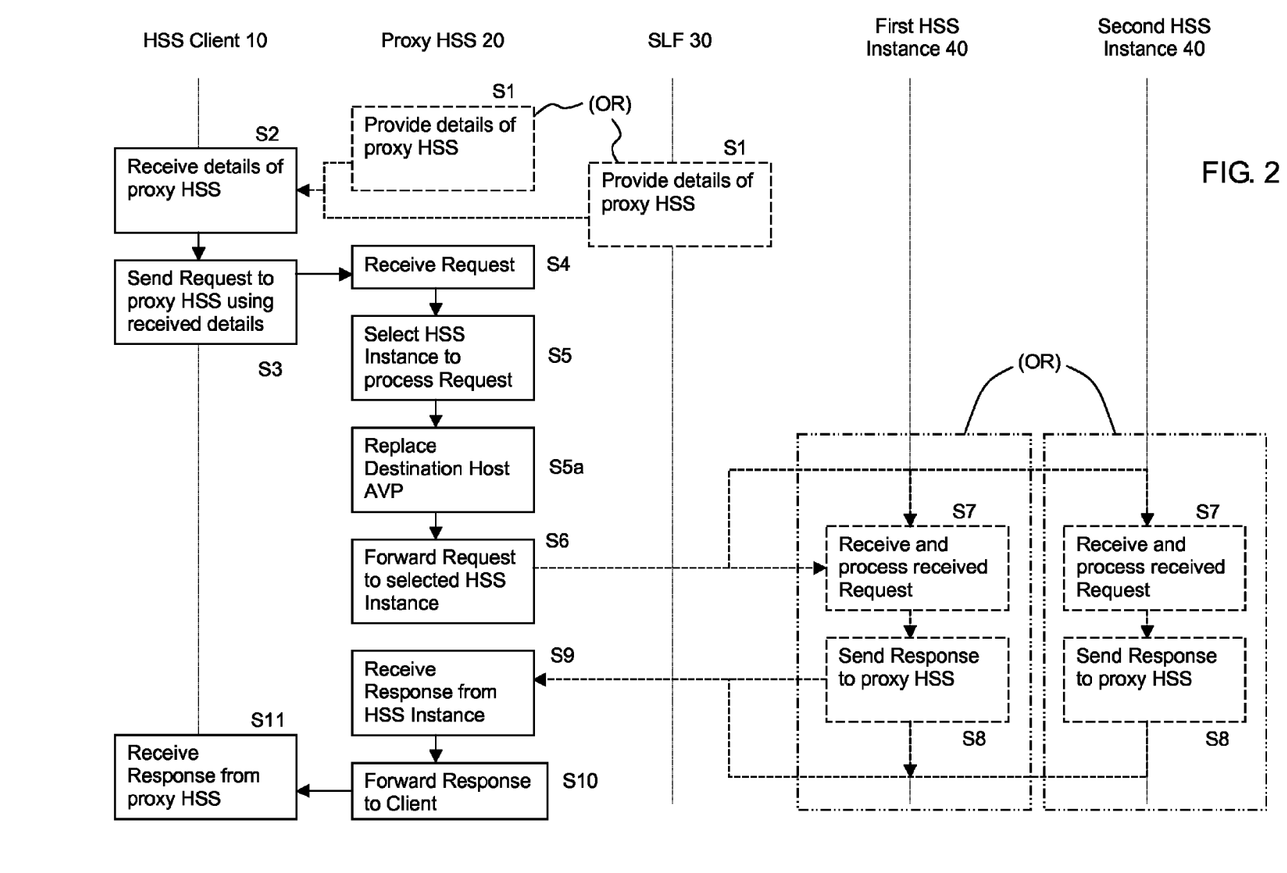
FIG. 2 is a schematic flowchart illustrating steps performed in an embodiment of the present invention.
Figure 3:
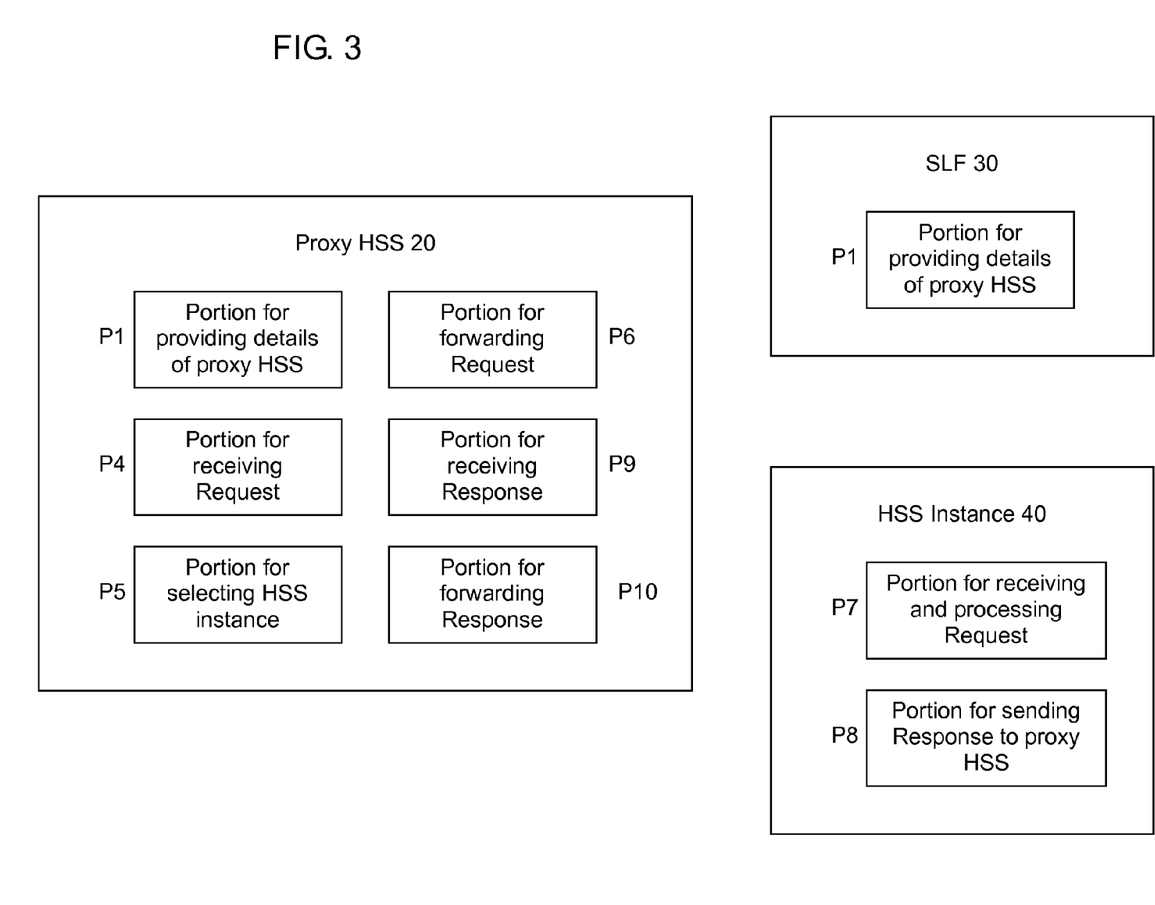
FIG. 3 is a schematic block diagram showing parts of apparatus embodying the present invention for performing the method of FIG. 2.

An embodiment of the present invention will now be described in more detail with reference to FIGS. 2 and 3. FIG. 2 is a schematic flowchart illustrating steps performed in an embodiment of the present invention, while FIG. 3 is a schematic block diagram showing parts of apparatus embodying the present invention.

FIG. 2 shows an HSS client 10 and an SLF 30, which have been described previously. An HSS in this example is provided a degree of redundancy by comprising first and second HSS instances 40. Finally, a proxy HSS 20 is also provided, whose function will become apparent from the description below.

In response to a request by the HSS Client 10 for details (e.g. a "Destination Host AVP") of an HSS relating to a particular user, in step S1 details of the proxy HSS 20 are provided to the HSS client 10, either from the SLF 30 (if there is one) or (e.g. if there is not a SLF) are configured beforehand at the HSS client 10, or are provided from the proxy HSS 20 itself. Advantageously, every HSS client 10 is configured with a single HSS Destination Host addressing the proxy HSS 20, which provides a simplified configuration of clients and, at the same time, allows to dispense with the need of a SLF. The details of the proxy HSS 20 are received by the HSS client 10 in step S2.

In step S3 the HSS client 10 sends a Request to the proxy HSS 20, using the details received in step S2, which is received in step S4 by the proxy HSS 20.

In step S5 the proxy HSS 20 performs a selection process to determine which of the first and second HSS instances 40 should be chosen to handle the Request; examples of possible criteria to be used in the selection process are set out further below.

Having made the selection of an appropriate HSS instance 40 in step S5, the Destination Host AVP received from the HSS client 10 is replaced in step S5a with the Destination Host AVP of the selected HSS instance 40. The Request is then forwarded in step S6 by the proxy HSS 20 to the selected HSS instance 40, which is received and processed in step S7 by the selected HSS instance 40.

When the Request has been processed, a Response is sent from the selected HSS instance 40 to the proxy HSS 20 and received by the proxy HSS 20 in step S9. In step S10 the Response is forwarded by the proxy HSS 20 to the HSS client 10, and received by the HSS client 10 in step S11.

Parts of the proxy HSS 20, SLF 30 and HSS instances 40 for performing the steps of FIG. 2 are illustrated schematically in FIG. 3, with parts P1 and P4 to P10 of FIG. 3 being adapted to perform the steps S1 and S4 to S10 respectively of FIG. 2.

It is possible to use a Diameter proxy agent (e.g. proxy HSS), inter-connecting all the nodes, at Diameter level. With this option no changes are needed in current client nodes, since all the logic can be centralized in the proxy, which replaces the "Destination Host AVP" received from clients (e.g. 10) that addresses the proxy 20 with the "Destination Host AVP" of the HSS instance selected therein, and that is usable to address to it a message received from a client.

Although extra processing and latency is introduced by the proxy, on the other hand queries from the HSS clients to the SLF can be removed, and the processing power and delays that that implies. Further, the HSS clients only need to be configured with an address of the Proxy HSS 20, and not of individual HSS instances. The clients then use said address (e.g. as "Destination Host AVP" if DIAMETER protocol is used) for sending messages and requests that need to be processed by a HSS instance, that will make these messages and requests to be automatically routed towards the Proxy HSS.

Figure 4:
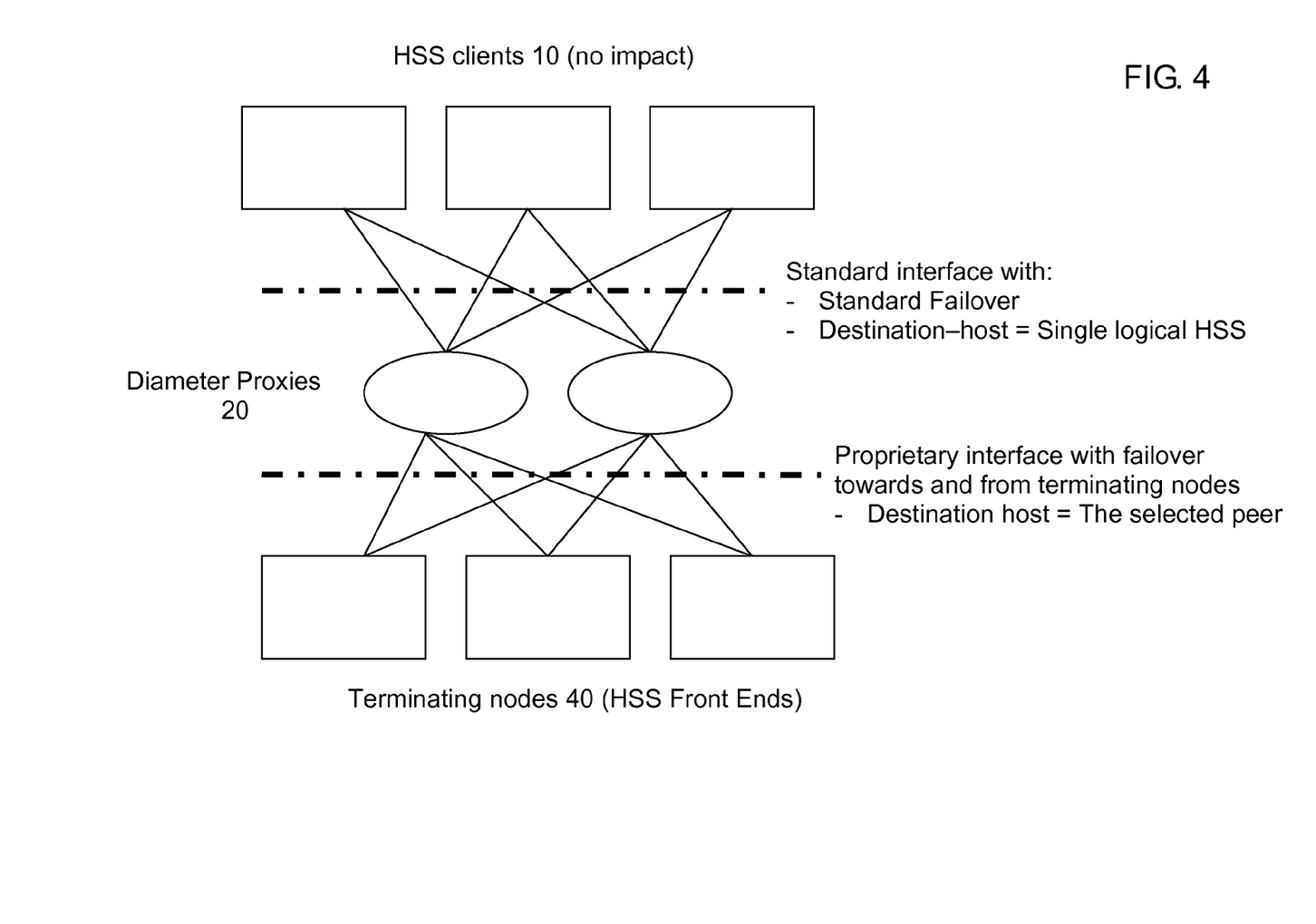
FIG. 4 is a schematic block diagram showing the use of multiple proxy HSSs (Diameter Proxies) in a system embodying the present invention.

It is possible to duplicate the proxy. Standard procedures for failover and link monitoring (see RFC 3588) can be used for this. FIG. 4 illustrates an architecture with multiple Diameter proxies 20.

Diameter messages originating in the HSS clients have the same destination host, as if there was a single HSS (no SLF) deployed in the network, which is the address of the Proxy HSS 20.

The method and Proxy of the invention are usable, both: in monolithic and tiered architectures. In short, a HSS instance according to a monolithic architecture comprises the processing means and application logic, so as to process signaling to be exchanged with HSS clients, as well as storage means comprising the necessary data (e.g. subscriber dynamic and static information) for accomplishing with said processing. In turn, a HSS "tiered" architecture comprises a plurality of HSS front-ends (FE), comprising the processing means and application logic, and a (physical or logical) centralized database DB that stores all the necessary data that can need any HSS FE for accomplishing their processing.

In the case of HSS Front Ends that access a Subscriber Data Base (DB), when this DB is distributed in two or more sites, the proxy can keep information about what is the most appropriate Front End (FE) or group of Front Ends, based on geographical data distribution, to serve each user.

The enhanced Diameter proxy application can monitor the state of the Diameter peers that can handle the message for a given user (these peers could be either monolithic HSS or Front Ends with access to a database that contains the user data). In case of redundancy, at least two Diameter peers (e.g. HSS instances) should be able to manage each user. The mechanism used in the Diameter proxies for monitoring the terminating peers could be either the same one included in the Diameter standard (DWR/DWA messages) or a different one.

The proxy could distribute the traffic between the different Diameter peers that are able to handle the operation, for example based on geographical location and availability. This distribution can be based on existing balancing mechanism such as server load, response time, round robin, etc.

Figure 5:
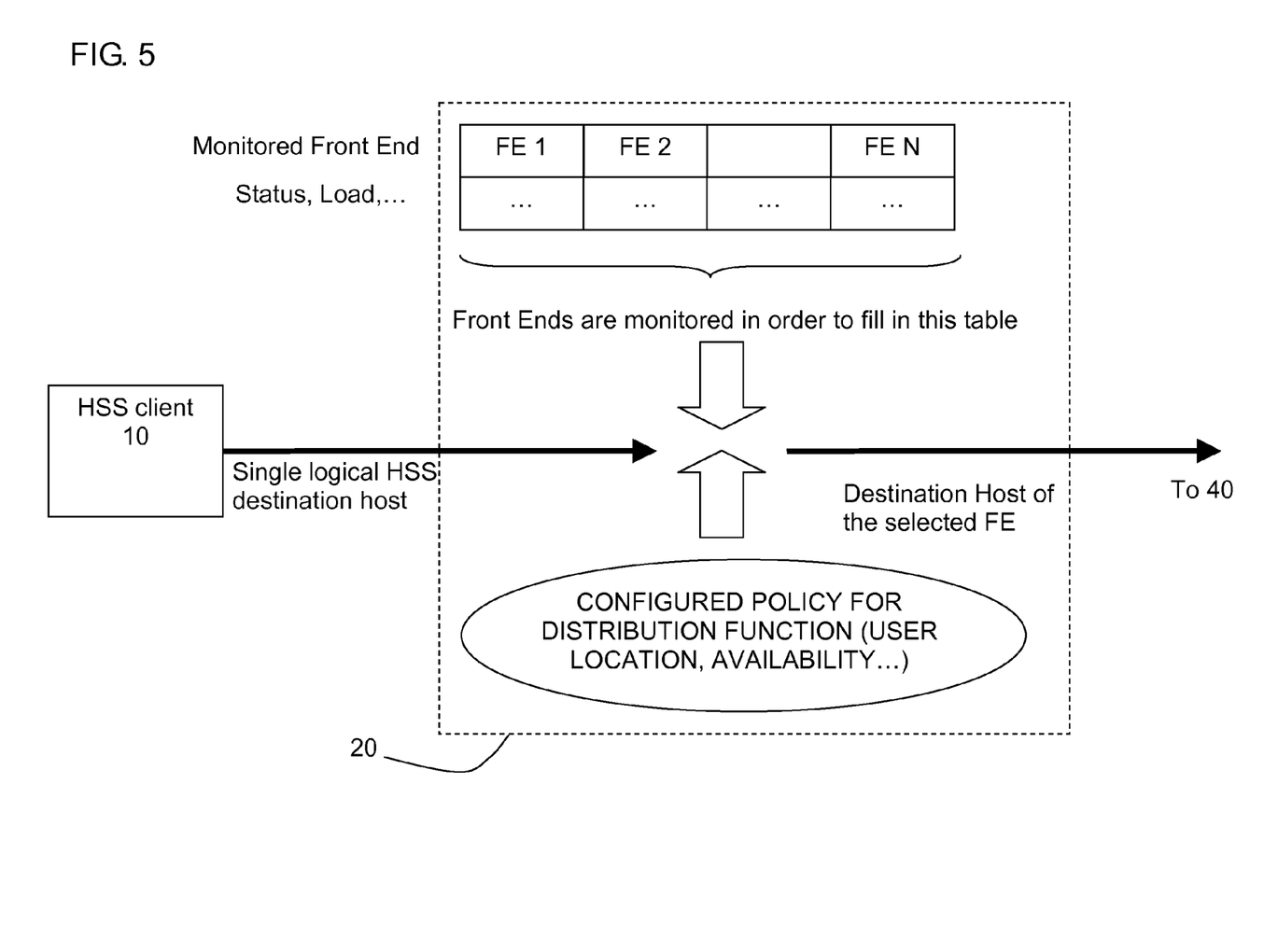
FIG. 5 is a schematic block diagram showing parts of an example proxy HSS with information being monitored for use in selecting an HSS instance (HSS front end).

These concepts are illustrated in FIG. 5.

Once a suitable terminating node has been selected, the destination host AVP received from the HSS client (i.e. the HSS Diameter URI that identifies the single logical HSS) is replaced according to the selected Diameter peer, and the Diameter message sent to it.

When an answer is received from the terminating node, it is desirable to keep the Diameter host ID consistent (that is, the answer should come from the Destination-Host used in the request). The internal architecture of this single logical HSS is transparent to the HSS clients, i.e. the proxy is not required to provide to the HSS client the real Diameter URI of the selected destination host.

Requests from the HSS can also be proxied. The HSS-Diameter proxy interface allows redundancy in both directions (the HSS client DiameterURI can be stored in the HSS/FE according to 3GPP standard procedures).

Although the present invention has thus far been described mainly in relation to an HSS client and an HSS, an embodiment of the present invention is applicable more generally. In a general sense, an embodiment of the present invention introduces a "Diameter proxy agent" (DPA) (usable in, but not limited to, an IMS architecture) between any "Diameter client" (e.g. Call Session Control function CSCF or Application Server AS) and any "destination host" (e.g. HSS).

The DPA acts as a standard proxy agent from the client's side, and is enhanced with regard to the destination host's side. The DPA may receive a request from a client containing a "DestinationHost" AVP. The DPA translates the (fictitious) "DestinationHost" AVP received from a client into an identifier usable to route the request towards the final HSS, which is selected by it according to "availability information". The DPA thus stores a table comprising (fictitious) "Destination-Host" AVPs that can be received from clients, which routes to the DPA, and the corresponding lists of real "Destination-Host" AVPs identifiers of the real HSSs that can be selected. Availability information per real HSS, which can be dynamically updated, as well as information about geographic location of HSSs vs. location of the clients, can also be kept by the DPA and used for the translation above.

An embodiment of the present invention allows HSS and/or HLR redundancy both in scenarios comprising SLF and in scenarios not comprising SLF, and is usable for monolithic or tiered HSS architectures.

The DPA of the invention can be provided with standardized Diameter redundancy procedures towards the clients, thereby allowing deployment of a plurality of DPAs, which provide a high availability of communication between clients and destination hosts. Further, no modification is necessary in Diameter clients (e.g. CSCFs) or Diameter servers (e.g. HSSs), as the novel processing carried out by the DPA acts only at the "Diameter" level, and not at application level (e.g. CX-intf related processing).

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

The invention claimed is:

1. A method of enabling redundancy for a Home Subscriber Server (HSS) of an Internet Protocol (IP) Multimedia Subsystem (IMS) with redundancy being provided by a plurality of HSS instances, where the data for each of a plurality of users is stored by more than one of the HSS instances, the method comprising:

arranging for a client node of the IMS to be provided with details of a proxy HSS representing the HSS instances in response to an inquiry from the client node, the details including a destination host Attribute Value Pair of the proxy HSS; and the proxy HSS:

selecting an appropriate one of the HSS instances to handle a request received at the proxy HSS from the client node to obtain a selected HSS instance, the request including the destination host Attribute Value Pair of the proxy HSS provided to the client node;

changing the destination host Attribute Value Pair received in the request based on the selected HSS instance; and forwarding the request to the selected HSS instance for handling.

2. The method in claim 1, further comprising, a Subscription Location Function (SLF) being provided in the IMS, arranging for the SLF to provide the client node with the details of the proxy HSS.

3. The method in claim 1, further comprising, a Subscription Location Function (SLF) not being provided in the IMS, arranging for the proxy HSS itself to provide the client node with the details of the proxy HSS.

4. The method in in claim 1, wherein a Diameter protocol is used for communication between the client node and the proxy HSS.

5. The method in claim 1, wherein redundancy of the proxy HSS is provided, by having a plurality of proxy HSS instances, with redundancy towards the proxy HSS instances being handled by standard Diameter protocol mechanisms.

6. The method in claim 1, wherein at least some of the HSS instances are different respective front ends to a database.

7. The method in claim 1, further comprising maintaining information at the proxy HSS for use in selecting the selected HSS instance.

8. The method in claim 7 wherein the information comprises at least one of:

information relating to respective loads being experienced by the HSS instances;

respective availabilities of the HSS instances; and respective status of the HSS instances.

9. The method in claim 7, wherein the information comprises geographic information relating to a plurality of sites.

10. The method in claim 1, further comprising monitoring a state of each of the HSS instances for use in selecting the selected HSS instance.

11. The method in claim 10, further comprising monitoring the state by using Diameter messages.

12. The method in claim 11, further comprising monitoring the state by using Device-Watchdog-Request/Device-Watchdog-Answer (DWR/DWA) messages.

13. The method in claim 1, wherein selecting the selected HSS instance is based on at least one of geographical location, availability, load, and response time.

14. The method in claim 1, wherein the proxy HSS is a node of the IMS.

15. The method in claim 1, wherein the proxy HSS is a Diameter proxy agent.

16. The method in claim 1, wherein the client node is a Diameter client.

17. The method in claim 1, wherein the client node comprises at least one of:

an Interrogating Call Session Control Function of the IMS;

a Serving Call Session Control Function of the IMS;

an Aggregation Proxy of the IMS; and an Application Server of the IMS.

18. An apparatus for enabling redundancy for a Home Subscriber Server (HSS) of an Internet Protocol (IP) Multimedia Subsystem (IMS) with redundancy being provided by a plurality of HSS instances, where the data for each of a plurality of users is stored by more than one of the HSS instances, the apparatus comprising:

means for arranging a client node of the IMS to be provided with details of a proxy HSS representing the HSS instances in response to an in from the client node, the details including a destination host Attribute Value Pair of the proxy HSS; and means for arranging for the proxy HSS to:

select an appropriate one of the HSS instances to handle a request received at the proxy HSS from the client node to obtain a selected HSS instance, the request including the destination host Attribute Value Pair of the proxy HSS provided to the client node;

change the destination host Attribute Value Pair received in the request based on the selected HSS instance; and forward the request to the selected HSS instance for handling.

* * * * *

UNITED STATES PATENT AND TRADEMARK OFFICE
CERTIFICATE OF CORRECTION

| | | |
|---|---|---|
| PATENT NO. | : 8,625,433 B2 | Page 1 of 1 |
| APPLICATION NO. | : 12/809456 | |
| DATED | : January 7, 2014 | |
| INVENTOR(S) | : Lafuente Alvarez et al. | |

It is certified that error appears in the above-identified patent and that said Letters Patent is hereby corrected as shown below:

In the Specification

In Column 9, Line 3, delete "proxy 20" and insert -- proxy HSS 20 --, therefor.

In the Claims

In Column 12, Line 28, in Claim 18, delete "to an in" and insert -- to an inquiry --, therefor.

Signed and Sealed this
Twenty-ninth Day of July, 2014

Michelle K. Lee
*Deputy Director of the United States Patent and Trademark Office*